(12) United States Patent
Wiggs et al.

(10) Patent No.: US 8,650,875 B2
(45) Date of Patent: Feb. 18, 2014

(54) DIRECT EXCHANGE GEOTHERMAL REFRIGERANT POWER ADVANCED GENERATING SYSTEM

(75) Inventors: B. Ryland Wiggs, Franklin, TN (US); Richard Thoms, Owens Crossroads, AL (US)

(73) Assignee: DWPNA, LLC, Nashville, TN (US)

(*) Notice: Subject to any disclaimer, the term of this patent is extended or adjusted under 35 U.S.C. 154(b) by 368 days.

(21) Appl. No.: 12/963,611

(22) Filed: Dec. 8, 2010

(65) Prior Publication Data

US 2012/0144829 A1 Jun. 14, 2012

(51) Int. Cl.
*F03G 7/00* (2006.01)

(52) U.S. Cl.
USPC ........................................ 60/641.2

(58) Field of Classification Search
USPC ................ 60/641.2, 641.3, 641.4, 641.5
See application file for complete search history.

(56) References Cited

U.S. PATENT DOCUMENTS

| | | | |
|---|---|---|---|
| 3,782,468 A | 1/1974 | Kuwada | |
| 3,824,793 A | 7/1974 | Matthews | |
| 3,898,020 A | 8/1975 | Matthews | |
| 3,953,971 A * | 5/1976 | Parker | 60/641.6 |
| 4,077,220 A | 3/1978 | Matthews | |
| 4,142,108 A | 2/1979 | Matthews | |
| 4,426,849 A | 1/1984 | Matthews | |
| 4,546,798 A * | 10/1985 | Porta | 138/149 |
| 4,590,386 A | 5/1986 | Wiggs | |
| 4,633,676 A | 1/1987 | Dittell | |
| 4,725,195 A | 2/1988 | Wiggs | |
| 4,878,540 A | 11/1989 | Raymond | |
| 5,272,879 A | 12/1993 | Wiggs | |
| 5,419,135 A | 5/1995 | Wiggs | |
| 6,167,715 B1 | 1/2001 | Herbert | |
| 6,301,894 B1 | 10/2001 | Halff | |
| 6,668,554 B1 * | 12/2003 | Brown | 60/641.2 |
| 6,931,879 B1 | 8/2005 | Wiggs | |
| 7,124,583 B2 | 10/2006 | Rider | |
| 2005/0061362 A1 | 3/2005 | Graham | |
| 2006/0026961 A1 | 2/2006 | Bronicki | |
| 2006/0130480 A1 * | 6/2006 | Lovelace | 60/641.2 |
| 2007/0101989 A1 * | 5/2007 | Strathman | 126/636 |
| 2007/0223999 A1 | 9/2007 | Curlett | |
| 2008/0016894 A1 | 1/2008 | Wiggs | |
| 2008/0173425 A1 | 7/2008 | Wiggs | |
| 2008/0271453 A1 * | 11/2008 | Faget-Mora | 60/641.3 |
| 2009/0133424 A1 * | 5/2009 | Wiggs | 62/260 |

OTHER PUBLICATIONS

Adelina P. Davis, Efstathios E. Michaelides, Geothermal Power Production from Abandoned Oil Wells, Energy 34 (2009), May 2, 2009, 866-872, Elsevier Ltd., San Antonio, Texas.

* cited by examiner

*Primary Examiner* — Thomas Denion
*Assistant Examiner* — Philip Eklem
(74) *Attorney, Agent, or Firm* — Miller, Matthias & Hull LLP

(57) ABSTRACT

A single closed loop direct exchange geothermal power production system that utilizes a refrigerant working fluid in at least one of three primary designs to generate electrical power from deep wells: with a first version of a direct exchange geothermal power generating system operating primarily on refrigerant vapor pressure; with a second version of a direct exchange geothermal power generating system operating primarily on liquid refrigerant gravitational pressure; and with a third version of a direct exchange geothermal power generating system operating primarily on both liquid refrigerant gravitational pressure and refrigerant phase change/expansion from a liquid to a vapor state.

51 Claims, 4 Drawing Sheets

DIRECT EXCHANGE GEOTHERMAL REFRIGERANT POWER ADVANCED GENERATING SYSTEM

FIELD OF THE DISCLOSURE

The present disclosure relates to direct exchange geothermal power generating systems. Here, geothermal power production is based on the pressure and/or phase change of a refrigerant fluid, or the like, created via direct heat exchange within a single closed refrigerant transport loop, utilizing a sub-surface well to access naturally occurring geothermal heat, as opposed to conventional geothermal power production designs that are traditionally based on circulating, or utilizing, at least one water loop circulating within a geothermal heat source to acquire heat, and then exchanging such heat with another separate and secondary power generating refrigerant fluid loop. Most common conventional geothermal system power production designs are termed binary systems, and typically require at least three primary heat exchange loops and at least two, and typically three, fluid circulating pumps.

As used herein, a "direct exchange" geothermal power generating system will be referred to as a "DX" geothermal power generating system, and will mean that naturally occurring geothermal heat is transferred directly to the primary circulating sub-surface and/or power production refrigerant (requiring only one primary heat acquisition exchange), instead of transferring geothermal heat to water via a first heat transfer step, and then transferring the heat from the water to a refrigerant via a secondary heat transfer step (as in a traditional binary geothermal power production system design).

BACKGROUND OF THE DISCLOSURE

Traditional geothermal power generating systems are well known. Such systems, which are a renewable energy source with relatively low carbon emission footprints, are comprised of three primary designs, as follows:

(1) Dry steam power plants utilize steam (exiting wells drilled to a naturally occurring underground heat and steam production source) to drive a power generation turbine, with the turbine typically utilized to produce electricity. The areas in which a dry steam plant may be feasibly implemented, however, are relatively few.

(2) Flash steam geothermal power plants use water at very high pressure and temperature (i.e., at least approximately 182° C. or 360° F.) that is pumped under high pressure from typically very deep wells, to the surface. Upon reaching the surface, all or a portion of the very hot and high-pressure water is flashed into steam.

The steam drives a power generation turbine, again with the turbine typically producing electricity. The waste heat can be utilized for some alternative direct heat use, or for an additional binary power production means (as hereinafter explained), and/or is ultimately condensed in a cooling tower (or otherwise condensed) and returned to the sub-surface geology via a closed loop, an injection well, or the like.

The geographic locations with conditions suitable to pressurize water to an extent great enough to produce viable amounts of electrical power, however, are not common and are typically not economically available. This is because the temperature of the hot water exiting the well may need to exceed at least about 360° F. (as noted above), and in some cases may need to exceed about 600° F., for economically viable power production, and system implementation and operation is costly to access such high-level natural heat conditions.

For example, while 600° F. temperatures can be accessed most anywhere via drilling a deep enough well, such extremely deep wells may typically need to be about eight miles deep, as the temperature in the earth's crust reportedly increases approximately 72-81° F. per mile of depth from the surface. There are areas in the world where molten magma is found closer to the surface, and such areas are referred to as geothermal "hot spots". However such "hot spot" areas are relatively rare.

Thus, to provide economically viable working pressure differentials for the turbine/generator situated between the geothermal heat source and the condenser (usually a cooling tower or the like) the water must be super-heated to a significant temperature typically found only at extreme depths. When one subjects a column of water to extreme depths, one increases the water pressure, which water pressure increases at about 0.433 pounds per square inch ("psi") per foot of depth. This very high-pressure situation is why extremely hot water is circulated into and out of a very deep well absent ever boiling (the water pressure and the boiling point are both significantly elevated). Therefore, at least one (and typically two) power-consuming water circulating pump is/are necessary, among other equipment, for a flash steam power production plant. Also, known flash steam plants use water and therefore are limited to using the boiling/vaporization properties of water during system design.

(3) Binary Cycle Power Plants can utilize lower temperature ranges than common Flash Steam Plants to ultimately drive a power generation turbine, which is typically utilized to generate electricity. In a Binary Cycle Power Plant, geothermally heated hot water and/or steam, as well as waste heat from nuclear or fossil fuel power plants, or the like, is carried by a first primary water loop to heat and vaporize a secondary fluid within a secondary fluid loop, which secondary fluid has a boiling point lower than that of the hot water circulating within the first fluid loop. After heat is exchanged with the secondary loop, the water is re-circulated to the primary heat source to regain the maximum amount of heat possible so as to provide a continuous heat supply source for the secondary fluid loop.

The heat supplied to the primary water loop vaporizes and pressurizes the secondary fluid (typically a refrigerant with a lower boiling/vaporization point than water) within a vaporization chamber. The vaporized and pressurized secondary fluid then drives a turbine and/or generator. After exiting the turbine or generator, the secondary fluid is then condensed, typically by an air-source condenser and/or by nearby naturally occurring cool water, and is next re-introduced by a liquid pump into the vaporization chamber. As explained, the vaporization chamber's heat is derived from the first and primary water loop's absorbed heat from the primary geothermal or waste heat source.

An example of one low temperature heat source currently utilized for such a binary system is a hot spring in Alaska that produces water at approximately 165° F., with the system being proximate to a readily available, and naturally occurring, cold-water river. The cold-water river temperature (reportedly at about 40-50° F.) condenses the secondary fluid. Thus, in this particular application, the working temperature differential range may be approximately 115-125° F.

There are additional varying offshoot modes of geothermal power production plants. For example, some such plants utilize the heat available in hot (fully or partially molten) magma (in the 650° C. range), or in hot dry rocks, or in geysers, etc.

Thus, most conventional geothermal power production plants require somewhat uniquely occurring circumstances to be economically viable, typically require at least two independent fluid loops (with 2-3 liquid pumps) and are not universally available. Binary systems utilizing waste heat sources are more common, but either nuclear or fossil fuels are typically required as the primary heat source, both of which present environmental challenges.

Further, traditional Enhanced Geothermal Systems (EGS), using a binary geothermal system, have environmental challenges. EGS designs utilize geothermal heat as the heat source for the secondary closed refrigerant loop in a binary system to produce useable power. EGS designs typically acquire geothermal heat via circulating brine (salt water) through artificially created rock fractures between two deep wells (typically as much as 15,000 feet deep each). Regarding environmental challenges, EGS designs can create seismic activity when fracturing dry hot rocks between deep wells; can contribute to groundwater pollution when rock fracturing chemicals seep up into the aquifers; and lose significant quantities of water on a continuous basis in the open loop portion deep below the surface between the supply and return wells.

Despite the drawbacks of conventional geothermal power production plants, they provide more reliable and constant energy output than other types of renewable energy sources. Solar and wind, for example, are generally environmentally safe but are contingent upon uncontrollable conditions, such as the sun shining and the wind blowing. Accordingly, an interest remains in providing geothermal power production plants that are economically viable.

SUMMARY OF THE DISCLOSURE

In view of the foregoing, the present disclosure provides a geothermal power production plant/facility that could be utilized most anywhere in the world, regardless of the availability of geothermal hotspots. Additionally, the power production plants disclosed herein may require only two, instead of three, primary heat exchange loops. Still further, the power production plants of the present disclosure may not require a liquid pump, or may require only one such pump, thereby to increase heat transfer efficiency and/or reduce system operational costs.

A renewable power production facility suitable for use nearly anywhere in the world, regardless of the availability of geothermal hotspots, may utilize the naturally occurring heat within deep geothermal wells/boreholes as a primary heat source; in conjunction with an air-source condenser and/or a water-source condenser and/or a near-surface ground source heat exchange condenser, and optionally primary and/or supplemental cooling produced by a separate heat pump system, all in conjunction with a working refrigerant (other than water), such as R-134A, R-125, $CO_2$, or the like.

The geothermal power production system may be comprised of a direct exchange (DX) system where the geothermal heat available for useful work is directly exchanged from the naturally occurring and renewable heat within the ground to a refrigerant circulating within the single closed loop system, as opposed to the available geothermal heat having to be transferred to water and/or to water/salt (brine) and then to another secondary closed loop containing a refrigerant.

Specifically, instead of using water to produce pressurized steam (a dry steam plant) and/or instead of using a geothermal heated water loop to heat a secondary fluid in a secondary fluid loop (a binary system), refrigerant fluid working pressure to spin a turbine/generator is obtained from directly circulating a primary liquid phase refrigerant, with a boiling point lower than water, directly into a hot sub-surface environment so as to directly transfer naturally occurring geothermal heat to the refrigerant liquid (without requiring the vaporization temperatures necessary to vaporize water and/or without requiring an additional primary heat transfer step).

The naturally occurring and renewable geothermal heat is utilized in at least one of three optional geothermal direct exchange refrigerant system designs to produce usable electrical power, as follows. (1) The geothermal heat directly vaporizes and pressurizes liquid phase refrigerant that is force pumped into a well, wherein the well has sufficient heat content to both vaporize and pressurize the refrigerant to an extent sufficient to power a vapor refrigerant turbine/generator to produce electrical power, with the vapor phase refrigerant thereafter condensed back into a liquid to repeat the process. (2) The geothermal heat directly phase changes a continuous flow of liquid refrigerant to a hot vapor, which vapor is hot enough to naturally exit the well in a vapor phase, which vaporized refrigerant is directed into a condenser where it is condensed back into a liquid phase, which liquid refrigerant is directed back into the well, so as to provide a continuous dynamic flow of liquid refrigerant down a deep well, thereby creating a continuous dynamic head pressure (via the force of gravity) that is used for electrical power production. (3) The geothermal heat directly heats and expands the density of the cooler liquid refrigerant being dropped into the well, with the expanded, but still liquid and less dense refrigerant being used to power at least one turbine/generator via both liquid flow pressure and phase change expansion, with the vaporized refrigerant being cooled and condensed and then dropped back down the well to repeat the process. One turbine/generator may be utilized to provide power via both liquid pressure/flow rate and refrigerant phase change/expansion; or, optionally, two turbine/generators may be utilized, with a first turbine/generator operating off of liquid pressure/flow rate, and with the second turbine/generator operating off of refrigerant phase change/expansion power.

An optional heat pump system may be provided for primary and/or supplemental refrigerant cooling/condensing. The heat pump system may include at least one air-source heat pump system, water-source heat pump system, direct exchange heat pump system, or other known type of heat pump system. The optional heat pump system may use any manufacturer-recommended refrigerant, which may or may not be the same as the primary refrigerant used to spin the turbine/generator in the primary geothermal power production system.

The expanded, lower density liquid refrigerant exiting the primary sub-surface geothermal power production loop is used to spin/power the turbine/generator. When an expanded liquid refrigerant (which refrigerant volume has expanded via absorption of geothermal heat) powers the turbine/generator, the turbine/generator will be a supercritical turbine/generator that produces power via both pressure and refrigerant fluid phase change (from a liquid to a vapor) as the refrigerant passes through the turbine. Alternately, when only expanded, lower density, liquid refrigerant exiting the primary sub-surface geothermal power production loop is used to spin/power the turbine, a second expansion turbine/generator may be used to take advantage of the power afforded via the phase change of the liquid refrigerant into a vapor as the pressure is decreased on the exit side of the second expansion turbine/generator.

After exiting the last turbine/generator, the refrigerant fluid is cooled and condensed or decreased in volume (in air, water, or a sub-surface environment, and a cold heat sink provided by a heat pump system) and is then dropped or pumped back into the primary sub-surface environment to regain naturally occurring geothermal heat to repeat the process.

One advantage of using a refrigerant, instead of water, as the working fluid used to obtain geothermal heat is that a refrigerant typically boils at a much lower temperature than water, which may: materially lower the cost and drilling depths that may otherwise be required to boil water; and/or may materially increase the primary working fluid flow rate, which affords increased energy production. Another advantage is that some refrigerants, such as R-134A, are heavier than water and therefore provide a material advantage in a system deriving some or all of its power via the effect of gravity upon the refrigerant working fluid. Thus, naturally occurring geothermal heat may be used to directly heat the refrigerant within a single primary closed-loop direct exchange geothermal heating power production system, via at least one of the three direct exchange (DX) methods disclosed herein.

For example, as mentioned, it is reported that the temperature in the earth's crust rises by about 72-81° F. per mile of depth from the surface. Thus, to heat water enough to boil it and then to pressurize the steam, one might have to drill to a depth of about 3 miles or more. On the other hand, many refrigerants boil at about minus 45°, F. Therefore, many refrigerants may be both boiled and pressurized within a much shallower well than is needed to boil water, such as only about one mile deep, for example. Thus, even though a refrigerant is more expensive than water, the drilling cost savings (drilling can reportedly cost up to about $5 million, or more, per mile) far outweigh the cost of utilizing a refrigerant over water. Further, since the subject disclosure utilizes a single sub-surface closed loop refrigerant fluid power production system (unlike an Enhanced Geothermal System, which has an open heat exchange loop through fractured rock or through permeable geology at the bottom between the supply and return wells), it is safe for the environment and does not lose any of its working fluid into the ground.

Thus, by using a single and closed refrigerant loop for geothermal power production, where the naturally occurring sub-surface temperatures are used for supplying heat to a refrigerant with a lower vaporization temperature (boiling point) than that of water (where the naturally occurring geothermal ground heat is the evaporator), at least one of the extra heat transfer/exchange steps required in a conventional binary geothermal power production system is eliminated, and the necessity for high enough temperatures to boil and/or pressurize and/or effectively use water and/or water and salt (brine) is eliminated, all resulting in higher efficiency geothermal power production and lower installation costs (thereby accelerating pay-back periods and cost effectiveness).

Generally, in all conventional binary geothermal power production systems, the secondary working fluid is cooled in air and/or water. However, due to the high efficiencies of a geothermal heat pump system, and particularly a DX geothermal heat pump system, the greatly enhanced cooling/condensing abilities, afforded via the cold refrigerant produced by a geothermal DX heat pump system, could potentially outweigh the DX geothermal heat pump system's operational power cost requirements. Therefore, using a geothermal heat pump system, particularly a DX geothermal heat pump system, could potentially be advantageous as at least one of a supplemental cooling/condensing means and, alternatively, even possibly as a primary condensing means for the refrigerant that is within the primary power production system.

When the cold refrigerant from a heat pump system, such as a DX geothermal heat pump system, is used as a supplemental and/or primary cooling/condensing means for the refrigerant within the primary geothermal power production loop, the hot gas/vapor in the primary power production loop exiting the turbine/generator typically may be exchanged in a refrigerant to refrigerant heat exchanger with heat from the primary power generation system refrigerant being transferred into the coldest refrigerant exiting the heat pump system expansion device, thereby providing at least one of supplemental and primary cooling to at least one of cool and condense the refrigerant within the primary power production loop.

While the cold refrigerant produced by a heat pump (such as a DX geothermal system heat pump, which generally has greater operational efficiencies than other heat pump system designs) may provide supplemental and/or primary cooling which may at least one of cool and condense the refrigerant within the primary power production loop, the simultaneous hot refrigerant produced by a heat pump can also optionally be utilized for other valuable applications, which could contribute to offsetting the cost of the heat pump system operation. Other optional valuable applications could be heat for homes, businesses, or commercial/industrial applications.

Similarly, the waste heat within the primary system refrigerant from the geothermal heat source, after the primary refrigerant has been utilized for power production purposes, and prior to being condensed for recirculation back into the well, can be used to heat water (via a refrigerant to water heat exchanger), or for any other useful heating purpose, so as to maximize the value of the available geothermal heat.

A specific optional approach to obtain usable geothermal power generation from a sub-surface environment may be to utilize at least one of an R-134A, a $CO_2$, and an R-125 refrigerant in a DX power generation system application where a refrigerant liquid is heated by naturally occurring geothermal heat in the lower portion of a deep well. Depending on nearer surface condensing temperatures available, generally, R-125 may be preferable for use at depths down to about 27,000 feet; R-134A may be preferable for use at depths between about 27,000 feet and about 30,000 feet; and $CO_2$ may be preferable for use at depths beyond about 30,000 feet. However, for general all-purpose system applications, R-134A may be a good selection because of both temperature/pressure vaporization considerations, and temperature/pressure condensation considerations.

In a design where at least one turbine/generator is powered by liquid refrigerant pressure/flow rate, and where at least one other turbine/generator is powered by refrigerant phase change/expansion (sometimes referred to as a supercritical turbine/generator), the primary working refrigerant remains in a liquid phase state within the deep well/borehole. However, as the refrigerant chemical is heated by the naturally occurring geothermal heat in the lower portion of the well, the refrigerant density is reduced and the refrigerant volume is expanded. The less dense and expanded, but still liquid, refrigerant is pushed up out of the well by the heavier column of cooler and denser liquid refrigerant traveling down into the well through a heavier liquid refrigerant return line to the well. The lighter and less dense refrigerant is pushed up and out of the well through a lighter liquid refrigerant supply line to the turbine/generator, situated at the surface, where the less dense, but pressurized, refrigerant liquid is both pushed through the turbine (via the gravitational force of the heavier column of liquid refrigerant in the return pipe within the well) and is also expanded and flashed into a vapor within at least one of the first turbine itself, or optionally within a secondary turbine principally deriving power from refrigerant liquid to vapor phase change (thereby additionally providing phase change/expansion power) to produce useable electrical power. Such an expansion/phase change turbine is sometimes referred to as a supercritical turbine.

It is possible that instead of a single turbine design to capture both liquid refrigerant pressure/flow rate power and refrigerant expansion/phase change power, it may be advantageous to use two turbine/generators in a line. The first turbine generator may be a liquid refrigerant pressure turbine/generator, and may be positioned on the surface where the less dense, but pressurized, liquid refrigerant first exits the well. The first pressure turbine/generator may derive its power from the gravitational force of the heavier column of liquid refrigerant in the return pipe within the well pushing the lighter column of expanded liquid refrigerant out of the well into and through the first pressure turbine/generator. The second turbine/generator may be a refrigerant phase change expansion turbine/generator, and may be positioned on the surface where the less dense, and now lower pressure liquid refrigerant first exits the first pressure turbine/generator. The second phase change/expansion turbine/generator may primarily derive its power from the phase change and expansion force of the liquid refrigerant as it changes phase from a liquid to a vapor within the expansion turbine.

The expanded refrigerant fluid/vapor exiting at least one of the single combined pressure and expansion turbine/generator and the secondary phase change/expansion turbine/generator may next be directed into a condenser where the refrigerant vapor is condensed into a cooler and denser/heavier liquid. A fan may optionally augment the refrigerant vapor flow out of the last turbine/generator and into the condenser. The cooler and denser liquid is then sent back down the well into the renewable geothermal heat source, where it again acquires heat to repeat the process.

When a refrigerant turbine/generator is utilized in at least one of the DX geothermal power production designs disclosed herein, the turbine/generator may be situated above the condenser so that any liquid phase refrigerant exiting the turbine/generator may fall, via gravity, directly into the condenser, absent the need of any liquid refrigerant pump to force liquid refrigerant into the condenser. Alternatively, the turbine/generator may be positioned adjacent to the condenser and the refrigerant vapor line exiting the turbine/generator may be insulated to the extent necessary to avoid any condensation of the now lower-pressure vapor refrigerant before the lower-pressure vapor refrigerant enters the condenser. Otherwise, a small liquid refrigerant pump may be required to transfer any prematurely condensed liquid refrigerant into the actual system condenser.

When such a refrigerant liquid pressure/expansion turbine/generator is utilized, as well as when any of the other DX geothermal power production system designs as disclosed herein are utilized, both the refrigerant return and supply liquid lines within the well may be well-insulated to avoid any "short-circuiting" and heat transfer within the well between the cooler return line from the condenser and the warmer supply line to the turbine/generator and to avoid any unproductive conductive heat transfer to the surrounding subsurface formation. Further, in addition to insulating the liquid refrigerant return line to the well in its entirety, and in addition to insulating that portion of the liquid refrigerant supply out of the well to the turbine/generator that is above the geothermal heat transfer area within the lower portion of the well, to still further provide extra insulation value, either a vacuum may be pulled within the empty annular well casing area where both the insulated supply and return refrigerant transport lines are located (above the geothermal heat transfer area of the lower well) or the empty annular space may be filled with a poor heat conductive material and/or fluid. Filling the empty interior portion of the well casing with a poor heat conductive material may be advantageous in certain applications to offset refrigerant fluid pressures within the refrigerant transport lines extending through the well.

A means of super-insulating the supply refrigerant line exiting the well to the turbine/generator may maximize all possible geothermal heat gain advantages to either cooler surrounding geology or to the cooler refrigerant liquid return line, via conductive heat transfer. Similarly, a means of super-insulating the return refrigerant line entering the well and traveling down to the geothermal heat source may maximize all possible cooler and heavier refrigerant advantages to either warmer surrounding geology or to the warmer refrigerant liquid return line, via conductive heat transfer. Prior art, such as dry steam plants and enhanced geothermal systems, for example, are not known to insulate, or at least do not significantly insulate, the fluid supply and/or return lines within the well. Thus, the insulation aspects disclosed herein may provide a significant efficiency advantage over conventional system designs.

The heat exchange area of the well, in a geothermal system application, optionally may be provided with a larger sealed casing segment for refrigerant heat acquisition to provide an enlarged surface area for geothermal heat transfer to the refrigerant. Holes may be provided in the well casing walls of the heat transfer casing segment(s) to permit circulation of any flowable materials (such as water and/or magma) that might exist in the geology at the subject heat exchange area depths. If no flowable materials exist in the geology at the subject heat exchange area depths, then the otherwise empty annular space between the well and the casing, as well as between the well casing and the larger sealed pipe segment (if the larger sealed pipe segment used for geothermal heat transfer itself is not a well casing segment) to be utilized for refrigerant geothermal heat acquisition, may be filled with a heat conductive solid (such as metal or the like), a heat conductive liquid, or a heat conductive grout (such as a cementitious grout like Grout 111) to maximize heat transfer from the surrounding natural geology to the refrigerant within the larger sealed pipe segment to be utilized for refrigerant heat acquisition. However, the cooler and more dense refrigerant in the return line to the well may be fully insulated and extended entirely to the bottom portion of the larger sealed pipe segment (which segment is to be utilized for refrigerant heat acquisition), to ensure the maximum amount of heat acquisition possible within the larger sealed pipe segment that is utilized for refrigerant geothermal heat acquisition, and so as to avoid any "short-circuiting" of the heat within the less dense, warmer refrigerant in the return line to the turbine/generator transfer into the cooler and more dense refrigerant within the refrigerant supply line to the well.

An optional fan may be provided within the refrigerant vapor transport line exiting from the last turbine/generator at a point before the refrigerant vapor transport line enters the condenser, thereby to enhance the discharge ability and refrigerant flow rate of the final turbine/generator into the condenser via a minimal additional power draw, when deemed to be advantageous.

Additionally, a liquid refrigerant pump may be provided in the liquid refrigerant supply line to the well, for use in initial system start-up whenever necessary, and for use as otherwise deemed necessary for system operation.

In an optional DX geothermal power generation system design where the naturally occurring geothermal heat is being used to both vaporize and pressurize a refrigerant, and where the pressurized refrigerant vapor is being utilized to power a turbine/generator, a liquid pump may be provided to force the condensed liquid refrigerant (the refrigerant may be condensed after exiting the turbine/generator, but before being directed back into the well) back into the liquid and vapor refrigerant transport lines comprising a closed loop within the well, which closed loop within the well may comprise the refrigerant vaporization and pressurization chamber. In such an optional design, the liquid refrigerant pump may have to exert an exiting liquid pressure per square inch ("psi") force that was greater than the psi force of the vaporized and pressurized refrigerant exiting the well and traveling into the turbine/generator. Generally such a parasitic liquid pump operation, when used in such an optional heated/pressurized vapor refrigerant DX power system production design, consumes far less electrical power to operate than is provided by the turbine/generator itself, so that the overall power production ability of such a DX geothermal power production design is still very positive.

For ease of system component servicing in any of the three optional DX geothermal power generation system designs disclosed herein, refrigerant flow cut-off valves may be provided on each side of the system's separate components where reasonably possible, such as, for example, on each side of the turbine/generator, the condenser, and the optional liquid pump, so as to permit easy servicing of parts without having to remove and replace significant amounts of refrigerant.

Further, for ease of system component servicing of an optional DX geothermal power generation system design, multiple smaller turbine/generators (as opposed to one large single turbine/generator) and multiple smaller condensers (as opposed to lone large single condenser) optionally may be used. The use of multiple turbine/generators and/or of multiple condensers permits the primary DX geothermal power generation plant to remain on-line and producing electrical power even if one smaller turbine/generator and/or even if one smaller condenser develops a mechanical problem. In such event, the shut-off valves around the defective mechanical component can simply be closed and the defective mechanical equipment can either be repaired or replaced, all while the primary power production ability of the DX geothermal power generation plant remains on-line and intact.

A concern when utilizing an optional DX geothermal power system design based primarily upon gravity, via the weight and gravitational pressure exerted by a column of liquid in a deep well, is the potential loss of the liquid phase refrigerant column. To assist in overcoming this concern, a liquid trap, comprised of at least one of a single U bend and a double U bend situated at the bottom of the liquid line within the well may be provided. The provision of a double U bend may have the advantage of directing the liquid refrigerant down into the very bottom of the well and/or into the bottom portion of the heat conductive casing (or "oven") area, which may be the hottest portion of the well. Also, via the use of a double U bend, at least one hole could be drilled into the top of the second inverted U bend, so as to provide a release for any refrigerant vapor bubbles, so as to help insure any such refrigerant vapor bubbles did not travel up into the downcoming liquid refrigerant line and impair the otherwise full liquid content/weight gravitational advantage.

A single U bend may also optionally be utilized as a means to provide a liquid trap for liquid refrigerant flowing within the primary liquid line within a deep well, so as to help avoid any undesirable loss of full liquid refrigerant content in the liquid line within the well.

In the lower portion of the well that has the highest naturally occurring temperatures, and that is intended for geothermal heat transfer to the primary working refrigerant fluid (unless the subject lower portion of the well is not already naturally filled with water or magma, or the like), a fill material may be provided within any empty annular space between the well, the well casing, and the refrigerant transport/containment tubing/piping/casing so as to facilitate good geothermal heat transfer to the refrigerant from the surrounding sub-surface geology. Such a fill material may be a good heat conductive fill material, such as a cementitious grout (such as Grout 111, as developed by the USA's Brookhaven National Laboratory in New York State) and/or a highly heat conductive metal, or the like, fill material.

Additionally, a turbine/generator may sometimes be physically situated above the condenser, so that any refrigerant that might have phased changed within the turbine/generator into a liquid when the DX power generation system is operating primarily via vapor pressure, or that might not have phased changed out of a liquid within the turbine/generator when the DX power generation system is operating primarily via both gravity pressure and vapor phase change/expansion through the turbine/generator, will automatically drain into the condenser via gravity, absent the need for any liquid refrigerant pump. Also, via positioning the turbine/generator above the condenser, any refrigerant that might phase change from a vapor into a liquid within the larger vapor refrigerant transport line between the turbine/compressor and the condenser will also automatically fall via gravity into the condenser absent the need for any liquid refrigerant pump.

Lastly, as a means to control the liquid refrigerant flow at or near the bottom potion of the well, in any optional DX geothermal power generation system design, and especially in a DX geothermal power generation system design that produces turbine power primarily off of liquid refrigerant gravity pressure (with the liquid refrigerant being heated and vaporized within the well only to the extent necessary to get the refrigerant vapor out of the well and into the condenser at or near the surface), a refrigerant valve may be used. The refrigerant valve may include a tapered wedge, or the like, that may lower into, and/or to raise out of, a collar positioned within a liquid return line at or near the bottom of the liquid refrigerant transport line within the well. A cable, or the like, may be attached to the tapered wedge and extend to a cable fastening device provided at an accessible location situated at or above the ground surface, where the cable may be lowered into or raised out of the well by means of a winch or the like, thereby effectively lowering or raising the tapered wedge into and out of the collar, thereby adjusting the liquid refrigerant flow rate at or near the bottom of the well as desired.

The use of a refrigerant in the primary sub-surface circulating working fluid loop used for geothermal heat acquisition (instead of the use of water and/or a water and salt brine solution as historically used in traditional and conventional geothermal power production system designs), for enhanced power production efficiencies is a material geothermal power system design improvement. The use of a refrigerant, instead of the traditional use of water and/or a salt water for geothermal heat absorption, is more advantageous in a single loop power geothermal generation design, as disclosed herein, because the refrigerant has a lower boiling point/temperature than water (affording an enhanced flow rate), and/or because such a refrigerant can have a heavier weight than water (affording more gravitational power advantages). Simulation testing has shown that refrigerants to utilize in deep well geothermal power production applications, utilizing the designs, as explained herein, may included R-125 to a depth of about 27,000 feet; R-134A to a depth of about 30,000 feet; and $CO_2$ to a depth beyond about 30,000 feet. With the exception that for both power generation and condensing purposes, the use of R-134A may generally still be more advantageous and preferable as a general all purpose refrigerant for use at all depths, both below and above 30,000 feet. Further, as one objective of the subject disclosure is to utilize the force of gravity for power production purposes, R-134A is heavier than water and is additionally advantageous in this regard. R-134A has a specific gravity of about 1.2, and therefore may provide a gravitational pressure advantage over water for purposes of the subject designs disclosed herein.

BRIEF DESCRIPTION OF THE DRAWINGS

For a more complete understanding of this disclosure, reference should be made to the embodiments illustrated in greater detail on the accompanying drawings, wherein.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The following detailed description is of the best presently contemplated mode of carrying out the subject matter disclosed herein. The description is not intended in a limiting sense, and is made solely for the purpose of illustrating the general principles of this subject matter. The various features and advantages of the present disclosure may be more readily understood with reference to the following detailed description taken in conjunction with the accompanying drawings.

Figure 1:
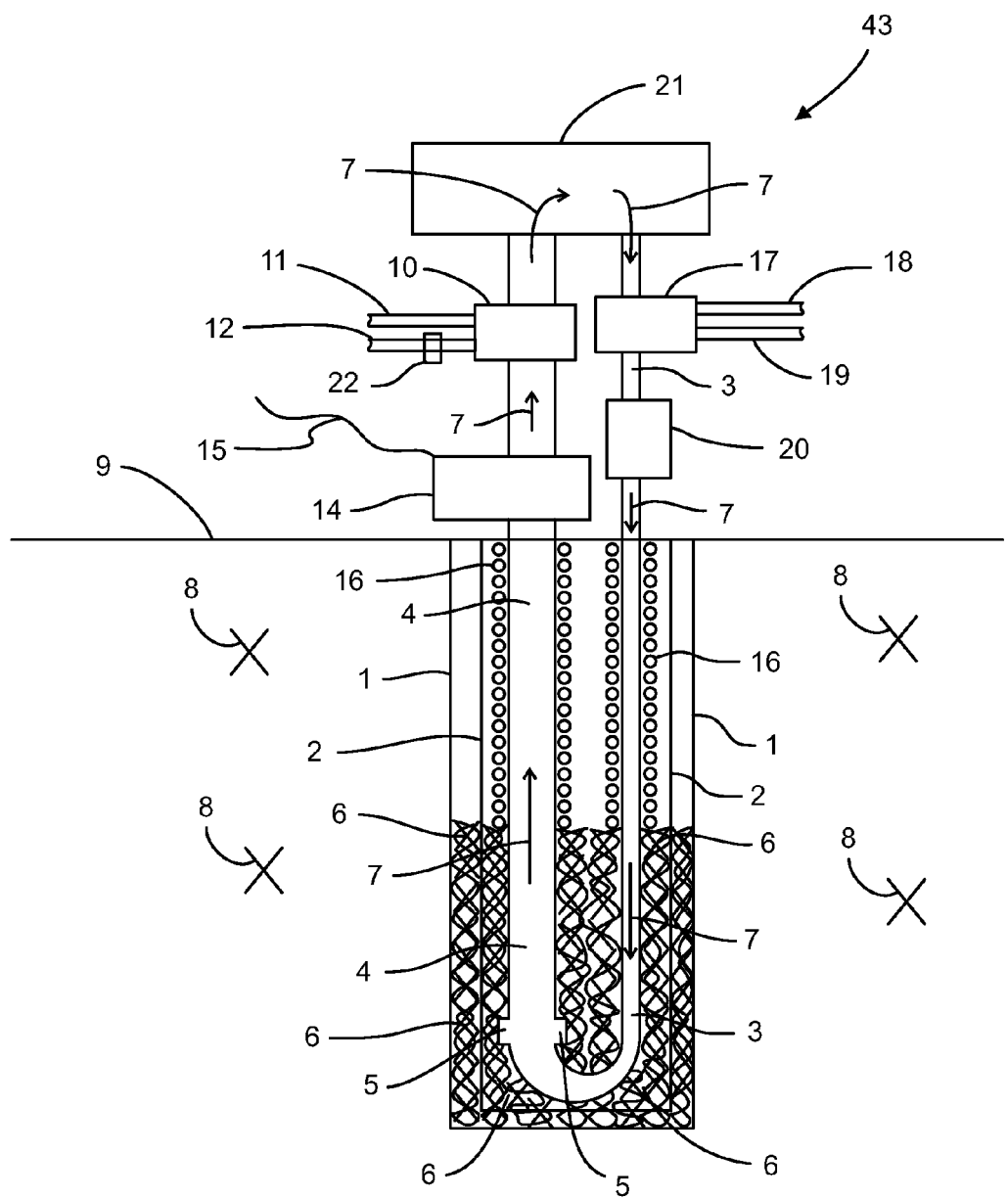
FIG. 1 is a side view of a direct exchange geothermal power generating system constructed according to the present disclosure, with the sub-surface environment acting as the primary evaporator for the refrigerant within the geothermal power generating system's closed refrigerant transport loop. Here, geothermal power is shown as being provided via a single closed refrigerant loop, where the hot sub-surface environment both vaporizes and pressurizes the refrigerant. Optional supplemental water heating and heat pump cooling of the primary working refrigerant is also illustrated.

Referring now to the drawings in detail, where like numerals refer to like parts or elements, FIG. 1 is a side view of a first embodiment of a direct exchange geothermal power generating system 43 constructed according to the present disclosure based upon refrigerant (indicated by directional flow arrows 7) being heated, phase changed into a vapor, and pressurized by the naturally occurring geothermal temperature within a well 1. Here, power is primarily derived via pressurized refrigerant 7 vapor driving a turbine/generator 14.

FIG. 1 shows a side view of the well 1 within a sub-surface environment 8, which may be at least one of ground, earth, rock, magma, and water. An optional heat conductive casing 2 formed of steel, metal, or other heat conductive material may be inserted into the well 1. A heat conductive fill material 6 may be disposed between the interior wall of the well 1 and the exterior wall of the casing 2 to facilitate geothermal heat transfer. When all or a portion of the well 1 is partially or fully saturated by water and/or magma, only the non-water/magma saturated portion of the space between the well 1 and the casing 2 may have fill material 6, unless otherwise required via applicable codes or laws. The fill material 6 may be a grout, such as cementitious Grout 111, or the like, which has at least an approximate 1.4 BTU/Ft. Hr. degree F. heat transfer rate. Grout 111, developed by the USA's Brookhaven National Laboratories, is environmentally friendly. Also, the fill material 6 may be comprised of a metal or similar highly heat conductive material.

A smaller sized liquid refrigerant transport line 3 may be disposed inside the casing 2. The smaller liquid refrigerant transport line 3 is coupled by a coupling 5 to a larger sized vapor refrigerant transport line 4, which coupling 5 is illustrated as being positioned at or near the bottom of the well 1. Generally, the smaller liquid refrigerant transport line 3 for transporting liquid phase refrigerant down to the geothermal heat exchange area of the well 1 may have an interior cross-sectional area that is at least about one-half the size of the interior cross-sectional area of the larger vapor refrigerant fluid transport line 4 (which line 4 could optionally also be the well casing 2 itself) transporting the refrigerant fluid out of the well 1 and to the turbine/generator 14.

Here, the annular space within the interior of the casing 2, containing the liquid line 3 and the vapor line 4, is also shown as receiving fill material 6 in its lower portion to increase geothermal heat transfer to the refrigerant 7 circulating within the power generating system from the warmer sub-surface environment 8 surrounding the lower portions of the well 1. Here, the sub-surface environment 8 is shown as surrounding the entire well 1, which well 1 is drilled to an appropriate depth below the surface 9 so as to access desirable geothermal heat levels. The desirable heat levels are not shown herein to any scale, but, as an example, are depicted by the lower portion of the well 1 and casing 2. As shown herein, the upper interior portion of the casing 2 may not be filled with any heat conductive material, so as to help inhibit conductive heat transfer from the circulating refrigerant 7 to undesirable cooler geologies in the sub-surface environment near the surface 9.

Also, the subject design showing geothermal heat transfer to the lower portions of a smaller liquid line 3 coupled to a larger vapor line 4 within a well 1, and near the bottom of the well 1, all encased within a heat conductive fill material 6, is shown herein as an optional design example. Other optional examples of geothermal heat transfer designs that may be utilized in conjunction with the disclosures herein are shown in the following FIGS. 2 and 3.

In this embodiment, a condenser 21 is shown above the ground surface 9. The condenser may include an air to refrigerant heat exchanger, such as finned refrigerant transport tubing exposed to air, and may also include a fan to increase air flow and therefore heat transfer between the finned tubing and surrounding air. The referenced finned tubing and fan are not shown, as same are well understood by those skilled in the art. The condenser 7 may also include a water to refrigerant condenser when an adequate water cooling supply (such as a river, a lake, a bay, or the like) is available. If a body of natural water, as opposed to air, is used as the condensing agent, the turbine/generator 14, the optional refrigerant to water hot side heat exchanger 10, the optional refrigerant to refrigerant cold side heat exchanger 18, and the optional liquid refrigerant pump 20, may all be positioned above the condenser 21 (which condenser 21 may be situated within the lower positioned body of water) at or above the ground surface 9 of the water.

Also, at least one of primary cooling and supplemental cooling may optionally be provided to the refrigerant 7 by means of an optional refrigerant to refrigerant cold side heat exchanger 17, or the like, which may include an array of flat plate heat exchangers configured to transfer heat from one refrigerant loop to another refrigerant loop. The optional supplemental cooling supplied to the refrigerant 7, via the refrigerant to refrigerant cold side heat exchanger 17, typically comes from the cold liquid fluid supply line 18 directly following an expansion device for the heat pump, which may advantageously be a heat pump and/or a geothermal DX system heat pump.

After the heat pump cold gas supply line 18 provides cooling to the refrigerant to refrigerant cold side heat exchanger 17, the cooling is next transferred to the refrigerant 7 within the primary power generating system 43. (Heat naturally flows to cold, so when cold/cooling is referenced as being transferred to refrigerant 7, in actuality, heat from the refrigerant 7 is being absorbed and removed, as would be well understood by those skilled in the art.) After the cooling supplied by the refrigerant exiting the heat pump expansion device has been supplied to the cold side heat exchanger 17, the heat pump refrigerant is returned, now warmed by the heat removed from the primary power refrigerant 7 circulating within the cold side heat exchanger 17, to the heat pump system via a heat pump warm gas return line 19 (the heat pump warmed gas/refrigerant return line 19 takes the warmed gas to the heat pump compressor, which then sends the now hot/compressed gas to a heat sink to repeat the process), so the optional heat pump can remain in operation, continuously supplying (when needed and cost effective) at least one of supplemental and primary cooling, via heat transfer within the cold side heat exchanger 17, to the refrigerant 7 entering the smaller sized liquid refrigerant transport line 3 within the primary power generation closed refrigerant loop.

Once the primary power refrigerant 7 has been both cooled and condensed by the condenser and/or optional heat pump system via a refrigerant to refrigerant cold side heat exchanger 17, the now condensed and liquid refrigerant 7 next travels to a liquid refrigerant pump 20, where the liquid refrigerant 7 is forced into the liquid refrigerant transport line 3 within the well 1, and then through the vapor line 4 within the well 1, where natural and renewable geothermal heat is acquired from the surrounding geology 8 around the lower portion of the well 1 used for geothermal heat transfer, which geothermal heat vaporizes and pressurizes the refrigerant 7. The liquid refrigerant pump 20 may be constructed to exert a greater liquid pressure on the liquid refrigerant entering the well 1 than the pressure of the vaporized refrigerant 7 exiting the well 1 via the vapor refrigerant transport line 4 on its way to the turbine/generator 14 (which may be a vapor driven turbine/generator).

Since a liquid refrigerant pump 20 is utilized to offset the vapor pressure within the refrigerant transport lines 3 and 4 created by the geothermal heat within the lower portion of the well 1, the liquid line 3 includes an insulation layer 16 that extends only to a point where the surrounding sub-surface environment 8 is cooler than the refrigerant traveling down into the well 1. Similarly, via this subject optional geothermal DX power generation system design that both vaporizes and pressurizes the refrigerant within the well 1, the vapor line 4, taking the refrigerant vapor 7 up to the turbine/generator 14, only needs to be insulated after the point where the heat content of the refrigerant, after absorbing geothermal heat from the bottom portion of the well, is greater than that of the surrounding sub-surface environment 8. The actual points of insulation for the liquid line 3 and the vapor line 4 within the well 1 are not shown herein to any scale, as the actual points must be determined on a case by case basis, depending on the amount of power to be generated and the depth and heat content of the well 1.

The liquid line 3 within the well 1, as an example, may have an interior cross-sectional area that is at least approximately half the cross-sectional area of the larger vapor line 4.

After exiting the well 1, the refrigerant 7 next travels into the turbine/generator 14. The vaporized and pressurized refrigerant 7 operates the turbine/generator 14 to produce at least one of useable mechanical and electrical power (herein shown as electrical power via an electrical power take off line 15, as an example).

Waste geothermal heat may be recovered downstream of the turbine/generator 14 such as by an optional refrigerant to water hot side heat exchanger 10. The hot side heat exchanger 10 may include an array of flat plate refrigerant heat exchangers submerged in water. The supplemental heat supplied to the refrigerant to water hot side heat exchanger 10 comes from the geothermal supplied heat still remaining in the refrigerant 7 after it exits the turbine/generator 14. The heated water may be directed as needed for utilization by a hot water supply line 11. After heat has been removed from the hot water supply line 11 for utilization, the remaining now cooled water is returned, via a cool water return line 12 back to the refrigerant to water hot side heat exchanger 10 for re-heating. The water may be circulated to and from the refrigerant to water hot side heat exchanger 10 by means of a water circulating pump (not shown).

After exiting the optional refrigerant to water hot side heat exchanger 10, the refrigerant 7 next travels to the condenser 21, where the process may be repeated for continual power production.

Figure 2:
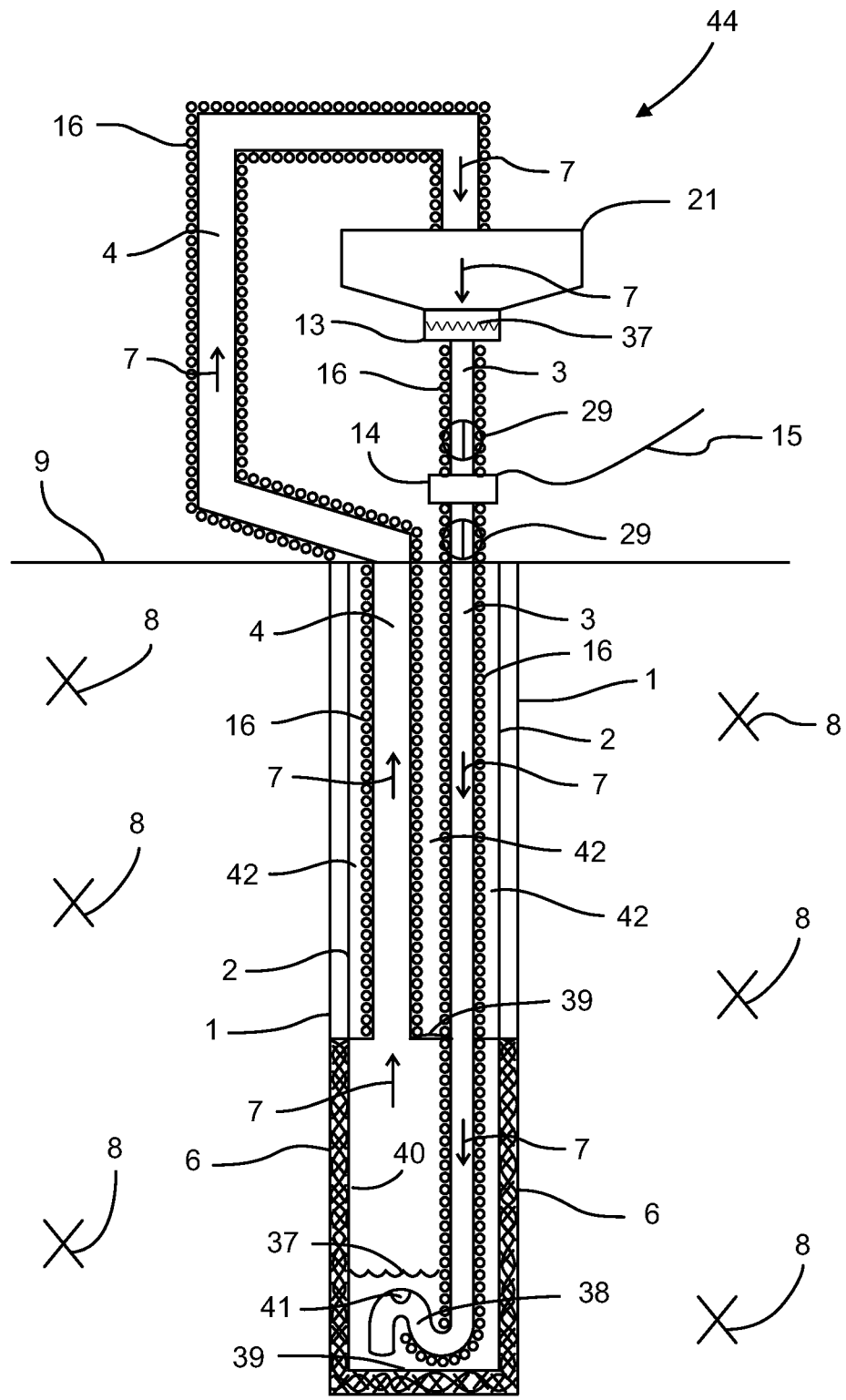
FIG. 2 is a side view of a direct exchange geothermal power generating system constructed according to the present disclosure, with the sub-surface environment acting as the primary condenser for the refrigerant within the closed refrigerant transport loop. Here, geothermal power is shown as being provided via a single closed refrigerant loop, where the hot sub-surface environment primarily vaporizes the refrigerant to get it out of the well to a condenser, in order to provide a continuous and unbroken liquid refrigerant dynamic flow rate through the turbine/generator all the way to the bottom of the well, thereby maximizing the gravitational force on the dynamic liquid refrigerant column and simultaneously maximizing power generation.

A second embodiment of a direct exchange geothermal power generating system 44 is illustrated in FIG. 2. This system 44 uses a refrigerant 7 that is heated and undergoes a phase change from liquid into vapor by the naturally occurring geothermal temperature within a deep well 1, and generates power primarily from the gravitational pressure of a column of liquid refrigerant within the deep well 1. The heated, vapor refrigerant produced at the bottom of the well 1 naturally travels upward from the well to a condenser 21 without the need of a pump.

The well 1 is formed in a sub-surface environment 8 which may include at least one of ground, earth, rock, magma, and/or water. An optional heat conductive casing 2, which may be formed of steel, metal, or other heat conductive material, is disposed within the well 1. A heat conductive fill material 6 is disposed between the interior wall of the well 1 and the exterior wall of the casing 2 in the lower portion of the well 1 to effect and promote geothermal heat transfer. When all or a portion of the well 1 is fully or partially saturated with water/magma, only the non-water/magma saturated portion of the well intended for geothermal heat transfer may be filled with fill material 6, unless otherwise required via applicable codes/laws. The fill material 6 may be a grout, such a Grout 111, or the like, material, which has at least an approximate 1.4 BTU/Ft. Hr. degree F. heat transfer rate. Grout 111 was developed by the USA's Brookhaven National Laboratories, has a good heat transfer rate, and is environmentally friendly. Also, in lieu of a cementitious grout, the fill material 6 may comprise a good heat conductive metal fill, or the like. The upper, non-heat transfer portion of the well 1, above the lowermost casing segment 40 and between the interior wall of the well 1 and the exterior wall of the casing 2, is illustrated as not receiving fill material 6 to inhibit heat transfer in this area.

A smaller sized liquid refrigerant transport line 3 is disposed within the casing 2 extending down to a double U bend 38 located at or near the bottom of the well 1. A layer of insulation 16 may surround the liquid transport line 3. The double U bend 38 may create an effective liquid trap near the bottom of the well 1 that assists in insuring the liquid refrigerant column within the entire liquid line 3, extending from the condenser 21 and/or the liquid refrigerant holding tank 13 to an actual upper and lower sealed 39 lowermost casing segment 40 near the bottom of the well 1, where within which lowermost casing segment 40 maximum available geothermal heat is absorbed by the cooler refrigerant 7 exiting from the double U bend 38.

The double U bend 38 is herein shown with a hole 41 at the top of the second U bend 38b, illustrated as an inverted U bend, to permit any vaporized refrigerant to escape into the lowermost casing segment 40 without impeding the downflow of liquid refrigerant 7 through the primary liquid line 3 within the well 1.

Liquid refrigerant may accumulate within the lowermost casing segment 40 to a refrigerant level 37. The lowermost casing segment 40 may include a seal layer 39 to prevent the refrigerant from leaking to the sub-surface 8. While not drawn to scale, FIG. 2 illustrates how to maximize the refrigerant's 7 containment piping surface area exposure to the hottest lower portion of the well, where the lowermost casing segment 40 provides an expanded surface area "oven" to heat and vaporize the refrigerant 7. A larger sized vapor refrigerant transport line 4, having an insulation layer 16, extends from the top of the casing segment 40, up and out of the well 1, to the condenser 21. As an example, the larger refrigerant vapor line 4 may have approximately twice an interior cross-sectional area as that of the smaller liquid line 3.

The sub-surface environment 8 surrounds the well 1, which well 1 is drilled to an appropriate depth below the ground surface 9 so the circulating refrigerant 7 will acquire sufficient geothermal heat within the lowermost casing segment 40 to continuously vaporize the liquid refrigerant dropping out of the condenser 21 into the liquid refrigerant holding tank 13. As vapor always fills available space, and as warmer/hot vapor always rises, the hot vaporized refrigerant 7 will naturally fill and rise out of the lowermost casing segment 40 (the "oven") and travel up through the larger vapor refrigerant line 4 without the need for any refrigerant pump. Once reaching the surface, the vapor refrigerant 7 is directed into a condenser 21.

In this design, the condenser 21 is located above the ground surface 9. The condenser may include an air to refrigerant heat exchanger, which may consist of finned refrigerant transport tubing exposed to air accelerated by a fan, with the cooler air comprising the system's heat sink.

The condenser 21 may alternatively include a water to refrigerant 7 condenser 21 when an adequate water cooling supply is available. If a body of natural water, instead of air, is used as the condensing agent, the turbine/generator 14 with its electrical power take off line 15 and the liquid refrigerant holding tank 13 may all be positioned within watertight containers (not shown) below the condenser 21 (with the condenser 21 situated within the body of water below the surface 9).

After exiting the condenser 21, the now liquid refrigerant 7 travels into an optional liquid refrigerant holding tank 13. The holding tank 13 provides a safety reservoir of liquid refrigerant 7 to help insure that any fluctuations in refrigerant 7 condensation rates within the condenser 21 (caused by changes in the air or water heat sink temperatures within the condenser 21, or other fluctuating conditions) and/or caused by any fluctuations in vaporization rates within the lower portion of the well 1 (caused by fluctuations in system run times, fluctuations in the condensation rate and resulting varying refrigerant 7 flow rates, etc.) does not deplete the constant dynamic full liquid refrigerant 7 flow through the turbine/generator 14, which could otherwise result in loss of design liquid refrigerant 7 column dynamic head pressure.

The holding tank 13 may maintain at the liquid refrigerant level 37, so as to help insure a constant liquid refrigerant 7 column dynamic head pressure within the refrigerant transport liquid line 3. Via the Bernoulli Equation, the power available in the unbroken dynamic flow of liquid refrigerant 7 within the liquid refrigerant line 3 portion of the system is about the same at the top as at the bottom. Thus, the "pull" force of the entire liquid refrigerant 7 column is about the same at the top as the "push" force is at the bottom of the well 1. The turbine/generator 14 may be located at the top of the well 1 as shown to acquire power from the slight "push" force in the relatively short liquid line 3 segment above the turbine/generator 14 and below the liquid refrigerant holding tank 13, as well as the far more significant "pull" force in the very long liquid line 3 segment below the turbine/generator 14 extending down to the double U bend 38 near the bottom of the well 1.

Alternatively, although not shown herein in detail, if the turbine portion of the turbine/generator 14 shown herein may be located within the liquid refrigerant transport line 3 near or at the bottom of the well 1, it may be configured to transfer power to a generator portion of the turbine/generator that is located at or above the surface 9 (optionally in about the same location as where the combined turbine/generator 14 is shown in FIG. 2). The turbine portion and the generator portion of a turbine/generator 14 are well understood by those skilled in the art, and are therefore only described, and are not shown as being distinguished, herein.

Liquid refrigerant shut-off valves 29 may be positioned on each side of the turbine/generator 14 to demonstrate how any particular segment of the geothermal power generating facility can be easily isolated for servicing without having to remove all of the refrigerant 7 within the entire system. The shut-off valves 29 are shown as being in an open position.

Once the refrigerant has been both heated and vaporized via the naturally occurring geothermal heat from the subsurface formation 8 surrounding the lowermost casing segment 40, the now hot vaporized refrigerant 7 travels up and out of the well to the condenser 21 where the entire process may be repeated for continuous electrical power production.

In this subject DX geothermal power generating system 44, the refrigerant 7 may maintain a minimal temperature differential throughout the entire power generation process: with the liquid refrigerant 7 traveling down into the well 1 only gaining enough geothermal heat within the lowermost casing segment 40 of the well 1 to phase change into a vapor (only acquiring enough geothermal heat to exit the well 1 without a phase change back into a liquid before entering the condenser 21); and with the vapor refrigerant 7 exiting the well 1 only having lost enough heat within the condenser 21 to phase change back into a liquid refrigerant 7.

To avoid prematurely vaporizing the liquid refrigerant 7 as it travels down the well 1 in the liquid line 3, and to avoid prematurely condensing the vapor refrigerant 7 as it travels out of the well 1 in the vapor line 4, an annular space 42 defined by the upper portion of the casing 2 remains empty and is not filled with fill material. The empty annular space 42 may consist of air or some other vapor, which is a poor heat conductor, or may be mostly void of any vapor via pulling a vacuum, so as to further inhibit any undesirable heat transfer in this area. Alternately and optionally, although not shown herein, the subject empty annular space 42 may be filled with at least one of a solid, a gel, and a liquid with poor heat conductive qualities so as to help offset the increasing interior pressure of the refrigerant 7 within the liquid line 3 as it travels down the well 1.

Figure 3:
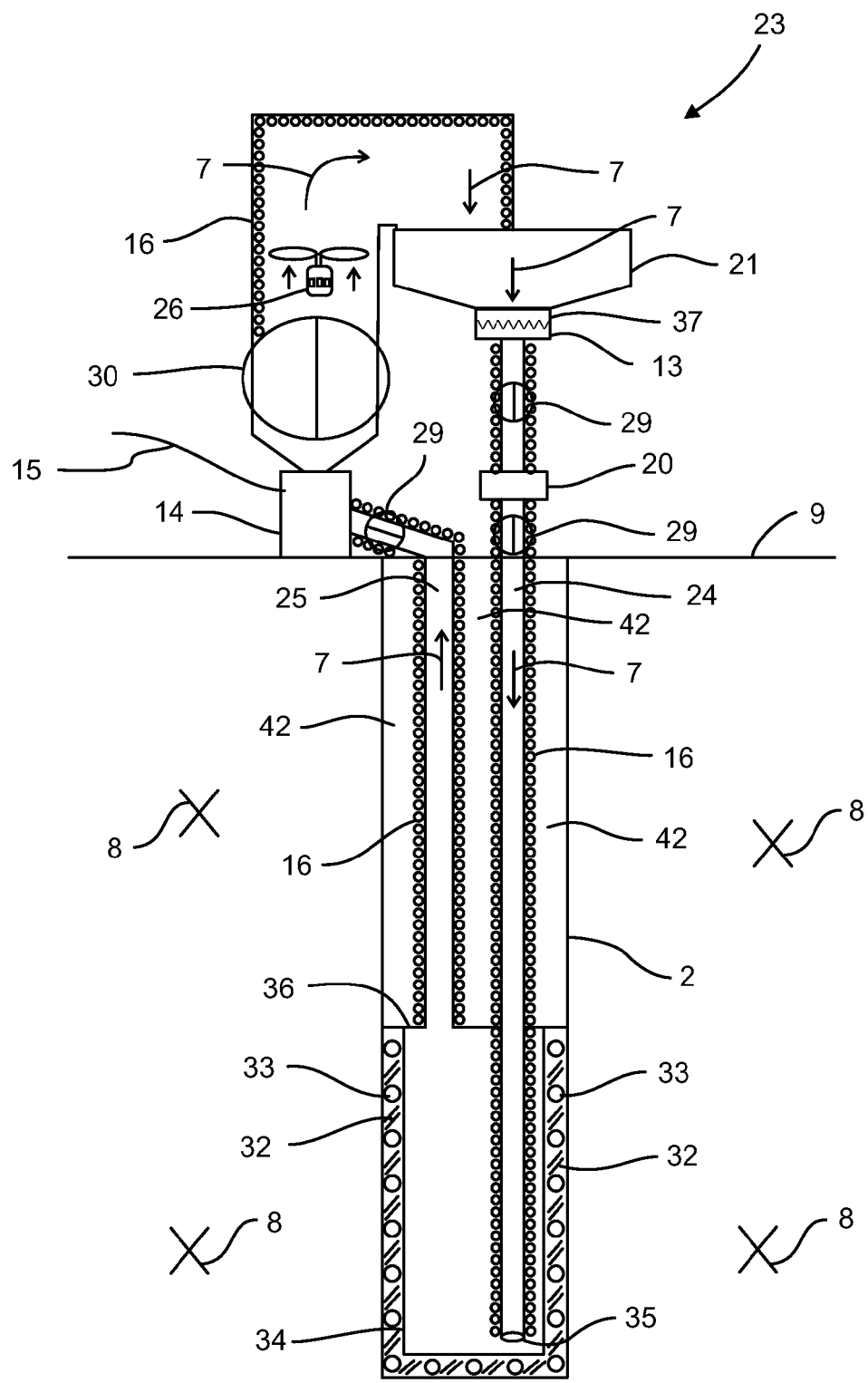
FIG. 3 is a side view of a direct exchange geothermal power generating system constructed according to the present disclosure, with the sub-surface environment acting as the primary heat supply for refrigerant within a closed refrigerant transport loop, which loop includes a turbine/generator operating off of power provided by both gravity pressure/liquid refrigerant flow rates and by refrigerant phase change/expansion within the turbine/generator. Geothermal power is provided via a single closed refrigerant loop, where the hot sub-surface environment heats and expands the liquid refrigerant once it nears the lower portion of the well, so as to provide working power via both the force of gravity/liquid refrigerant flow rate and the phase change/expansion of the refrigerant as the refrigerant exits the well and travels through at least one supercritical, or the like, turbine/generator.

FIG. 3 illustrates a third embodiment of a direct exchange geothermal power generating system 23 constructed according to the present disclosure. In this embodiment, the subsurface environment 8 acts as the primary heat supply for the refrigerant (indicated by directional flow arrows 7) within a closed refrigerant transport loop. The loop primarily includes a denser liquid refrigerant transport return line 24 (for clarification, the return line 24 construction itself is not denser, rather, the liquid refrigerant 7 within the return line 24 is cooler and denser) and a less-dense liquid refrigerant transport supply line 25 (for clarification, the supply line 25 construction is itself not less-dense, rather, the liquid refrigerant 7 within the supply line 25 is warmer, expanded, and less dense), together with a turbine/generator 14 and a condenser 21.

In the embodiment of FIG. 3, the system 23 operates primarily on both liquid refrigerant gravitational pressure and refrigerant phase change/expansion from a liquid to a vapor state. Power is principally derived from both the effect of gravity and the phase change expansion of the working refrigerant fluid.

The closed single loop of the DX system 23 includes a liquid refrigerant pump 20 that is used only as necessary at system start-up, and only as otherwise necessary for continuous system operation, although any positive value via use of the pump 20 during actual system operation after initial system 23 start-up is unlikely.

Also within the single loop, an optional fan 26 is shown for enhancing the vapor refrigerant flow out of the turbine/generator 14 into the condenser 21 whenever the use of such a fan 26 is deemed advantageous. After the refrigerant 7 exits the condenser 21, the refrigerant 7 acquires a cooler and denser liquid state, with the liquid refrigerant 7 within the liquid holding tank 13 being indicated by a liquid refrigerant level 37 in a liquid holding tank 13 positioned below the condenser 21. The liquid holding tank 13 helps to insure a continuous uninterrupted cooler condensed liquid flow into and through the denser refrigerant return line 24 within the well casing 2.

The denser refrigerant return line 24 may be insulated 16 along its entire path, from the condenser 21 to the lower distal open end 35 near the bottom of the well and casing 2, so that the cooler liquid refrigerant 7 remains as cool and as dense as possible to provide a maximum pressure differential between the refrigerant within the denser refrigerant return line 24 and the refrigerant within the less-dense refrigerant supply line 25, thereby maximizing pressure differential power generation via the turbine/generator 14.

Similarly, the less-dense refrigerant 7 within the less-dense refrigerant supply line 25, shown herein as being situated within the well casing 2 but above the larger pipe segment 34, may also be well-insulated 16 to prevent any geothermal heat loss as the less-dense refrigerant 7 travels through the less-dense refrigerant supply line 25 to the turbine/generator 14. The less-dense refrigerant supply line 25 is shown as being insulated 16 from an exit point from the upper top portion 36 of the larger sealed pipe segment 34 all the way up to the turbine/generator 14. To provide additional insulation, a vacuum may be pulled within the empty annular space 42 within the casing 2, above upper top portion 36 of the larger pipe segment 34. Alternately, the empty annular space 42 may optionally be filled with a non-heat conductive vapor, and may also optionally be filled with one of a non-heat conductive gel, liquid, and fluid if it is desirable to provide some pressure offset to the refrigerant 7 pressure within the denser liquid refrigerant return line 24 and within the less-dense vapor refrigerant supply line 25.

For good geothermal heat transfer to the refrigerant 7 within the larger pipe segment 34 utilized for geothermal heat transfer to the refrigerant 7, the otherwise empty space between the casing 2 and the larger pipe segment 34 may be filled with at least one of a heat conductive solid and liquid 32. Alternatively, if the surrounding geology 8 is comprised of a liquid, holes 33 can be provided in the side walls of the casing 2 surrounding the larger pipe segment 34 utilized for geothermal heat transfer so as to provide good thermal contact for heat transfer. The insulated 16 denser refrigerant return line 24 may extend all the way down through the larger sealed pipe segment 34 so that the lower distal open end 35 discharges the cooler and denser refrigerant 7 near the bottom of the larger sealed pipe segment 34, thereby permitting the refrigerant 7 to travel through the maximum possible length of the larger sealed pipe segment 34, thereby to obtain as much geothermal heat as possible from the surrounding sub-surface environment 8.

As the refrigerant 7 acquires natural geothermal heat within the larger sealed pipe segment 34, the refrigerant 7 is heated and its volume expands. The heated and expanded refrigerant 7, due to its expanded state, also becomes lighter within a given volume, when compared to the cooler and heavier liquid refrigerant within the denser refrigerant return line 24, with its weight measured within an equal given volume. However, due to the pressures exerted by gravity at deep depths (for example, about 0.433 psi is exerted by water per foot of increasing depth), and due to the known physical fact that boiling/vaporization temperatures increase as pressures increase, even though the lighter and expanded refrigerant 7 within the less-dense refrigerant supply line 25 is now much lighter than the heavier cooler liquid refrigerant within the denser refrigerant return line 24, the refrigerant 7 within the less-dense refrigerant supply line 25 is still under enough pressure so as to remain in a liquid phase, even after being heated by the naturally occurring geothermal heat within the subsurface geology 8 surrounding the lower portion of the well's casing 2.

During system operation, therefore, the heavier cooler liquid refrigerant 7 within the denser refrigerant return line 24, via the force of gravity, naturally pushes the lighter hotter liquid refrigerant 7 within the less-dense refrigerant supply line 25 out of the casing 2 and into a turbine/generator 14. Here, the turbine/generator 14 is shown as having an electrical power take off line 15. The turbine portion of the turbine/generator 14 may include a turbine that derives its power from a forced flow rate of the liquid refrigerant, as well as via the refrigerant itself expanding and phase changing from a liquid to a vapor within the turbine.

Alternatively, although not shown herein in FIG. 3, instead of one single turbine/generator that operates via both pressure/liquid flow rate and liquid refrigerant phase change/expansion into a vapor, at least one of two respective turbine/generators may be optionally provided, with a first respective liquid pressure/flow rate turbine/generator (identified by reference numeral 27 in FIG. 4 as an example), and with a downstream, second respective refrigerant phase change/expansion turbine/generator (identified by reference numeral 28 in FIG. 4 as an example), so as to help maximize geothermal electrical power production from a single loop DX geothermal power production system 23 as otherwise shown herein.

After exiting the turbine/generator 14, shown herein with an electrical power take off line 15, the now expanded and vaporized refrigerant next flows into a larger vapor transport line 4 that leads into the condenser 21. Once in the condenser 21, the refrigerant vapor is cooled and condensed back into a liquid phase refrigerant. The liquid refrigerant 7 is shown here as exiting the condenser 21 and at least partially filling the liquid refrigerant holding tank 13, as indicated herein by a liquid refrigerant level 37, so as to always insure there is no lack of liquid refrigerant 7 entering and filling the denser refrigerant return line 24, where the process may be repeated.

To facilitate servicing various component parts situated above the ground surface 9, as an example, liquid refrigerant cut-off valves 29 are shown herein as being provided on each side of the liquid refrigerant pump 20; a liquid refrigerant cut-off valve 29 is shown as being provided on the liquid refrigerant side of the turbine/generator 14, with a vapor refrigerant cut-off valve 30 provided on the vapor side of the turbine generator 14; and a vapor refrigerant cut-off valve 30 is shown as being provided on the vapor refrigerant side of the fan 26 and of the condenser 21, with a liquid refrigerant cut-off valve 29 being provided on the liquid refrigerant side of the condenser 21 (shown herein as being positioned below the liquid refrigerant holding tank 13).

For additional clarification regarding the subject DX geothermal system design 23, which optionally provides power based upon at least one of gravity pressure/liquid flow rates and refrigerant phase change/expansion, while both the denser refrigerant return line 24 and the less-dense refrigerant supply line 25 are shown herein as being about the same size, if this were optionally to be the case, the flow rate of the warmer and lighter refrigerant 7 within the less-dense refrigerant supply line 25 may be much greater than the flow rate of the colder and denser refrigerant 7 within the denser refrigerant return line 24. Although not shown herein, the less-dense refrigerant supply line 25 could optionally be of an appropriate larger size than the denser refrigerant return line 24, so as to actually equalize the flow rate/speed of the refrigerant 7 within both the less-dense refrigerant supply line 25 and the denser refrigerant return line 24. Alternately, although not shown herein, the less-dense refrigerant supply line 25 could optionally be of an appropriate even still larger size than the denser refrigerant return line 24, so as to actually slow down the flow rate/speed of the refrigerant 7 within the less-dense refrigerant supply line 25 beyond that of the denser refrigerant return line 24.

In fact, although not shown herein, if at least one of the entire interior of the well casing 2 and the exterior of the well casing 2 were adequately insulated above the larger sealed pipe segment 34, the otherwise empty annular space 42 within the casing 2 could optionally be used as the less-dense refrigerant transport line 25.

Figure 4:
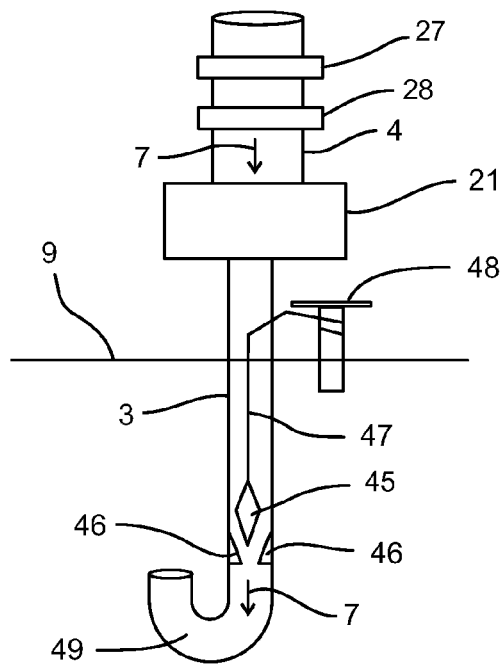
FIG. 4 is a side view of a means to control the liquid refrigerant flow near the bottom distal end portion of the return liquid refrigerant line within the well, as well as an optional design where at least one turbine/generator is situated above the condenser.

FIG. 4 is a side view of a means, such as a refrigerant flow valve, to control liquid refrigerant flow near the bottom distal end potion of the return liquid refrigerant line 3 within the well (the well is not shown herein, but is depicted as 1 in FIG. 1 and in FIG. 2 hereinabove). The means includes a tapered wedge 45, or the like, configured to lower into and/or to raise out of a collar 46 within a liquid return line 3 at or near the bottom of the liquid refrigerant transport line 3 within the well 1. A cable 47, or the like, may be attached to the tapered wedge 45 and extend to an accessible location at or above the ground surface 9. Thus, the cable 47 could be lowered into, or raised out of, the well 1, thereby effectively lowering or raising the tapered wedge 45 into and out of the collar 46, thereby adjusting the liquid refrigerant 7 flow rate at or near the bottom of the well 1. Just above the ground surface 9, the cable 47 may be secured to a cable fastening means 48 (such as a winch, or the like).

In FIG. 4, a single U bend 49 is shown as an example of an optional means to provide a liquid trap for liquid refrigerant 7 flowing within the primary liquid line 3 within a well to help avoid any undesirable loss of full liquid refrigerant 7 content in the liquid line 3.

Additionally, FIG. 4 illustrates two respective turbine/generators 27, 28 located above the condenser 21 so that any refrigerant 7 that might not have phased changed into a vapor within the second respective phase change/expansion turbine/generator 28 will fall directly into the condenser 21 via the force of gravity. Here, for example, the first respective turbine/generator 27 may be powered by means of liquid refrigerant 7 gravity pressure and flow rate, while the second respective turbine/generator 28 may be powered by means of the phase change/expansion of liquid refrigerant 7 into a vapor phase refrigerant 7, with the dual power means (gravity pressure and phase change) more fully described hereinabove in FIG. 3.

Also, a single turbine/generator (such as identified in FIGS. 1-3 by reference numeral 14) optionally may be positioned above the condenser 21, in place of the two respective turbine/generators 27, 28, to insure that any prematurely condensed refrigerant may fall, via gravity, directly into the condenser 21, absent the need for any liquid refrigerant pump (not shown).

Also, via positioning the turbine/generator(s) 27 and 28 (or turbine/generator 14 in FIGS. 1-3), above the condenser 21, any refrigerant 7 that might phase change from a vapor into a liquid within the larger vapor refrigerant transport line 4 between the turbine/generator, 27 and 28 (14 in FIG. 1, FIG. 2, and FIG. 3 hereinabove), and the condenser 21 will also automatically fall via gravity into the condenser 21 absent the need for any liquid refrigerant pump (not shown).

Figure 5:
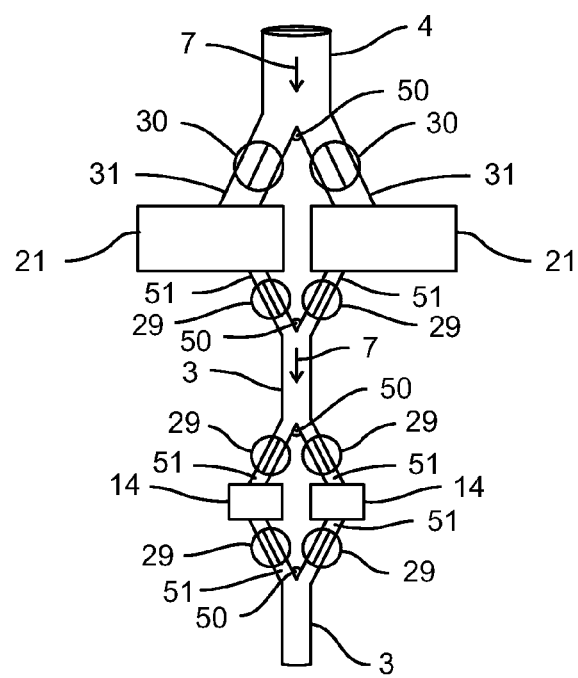
FIG. 5 is a side view of an optional DX geothermal power generation system design where multiple turbine/generators and multiple condensers are utilized, as well as where refrigerant flow shut-off valves are provided for ease of system component servicing.

FIG. 5 is a side view of an optional DX geothermal power generation system (such as system 43 in FIG. 1, system 44 in FIG. 2, and system 23 in FIG. 3) where multiple condensers 21 and multiple turbine/generators 14 are utilized. An advantage in using at least one of multiple turbine/generators 14 and multiple condensers 21 is that if a mechanical problem develops with one of the multiple turbine/generators 14 and/or with one of the multiple condensers 21, the rest of the subject equipment remains on line, and the entire DX geothermal power generation system is not out of commission pending the repair of only one mechanical component that can be easily isolated and repaired.

When multiple condensers 21 are utilized, the primary incoming vapor refrigerant transport line 4 may be distributed by a distributor 50 into an appropriate number of smaller distributed vapor refrigerant transport lines 31 (herein shown as two distributed vapor lines 31 as an example). Further, so as to be able to isolate and easily service any particular condenser 21, vapor line shut-off valves 30 are provided above each respective condenser 21, and liquid line shut-off valves 29 are provided below each respective condenser 21.

When multiple turbine/generators 14 are utilized (with a DX power generation system design 44, as shown hereinabove in FIG. 2, used herein as an example only), the primary incoming (in the directional flow of the refrigerant 7) liquid refrigerant transport line 3 may be distributed by a distributor 50 into an appropriate number of smaller distributed liquid refrigerant transport lines 51 (herein shown as two distributed liquid lines 51 as an example). Further, so as to be able to isolate and service any particular turbine/generator 14, liquid line shut-off valves 29 are provided above each respective turbine/generator 14, and liquid line shut-off valves 29 are provided below each respective turbine/generator 14 (where the turbine/generators 14 are operating via liquid refrigerant 7 gravity pressure). If the respective turbine/generators 14 were operating via vapor pressure (as shown via the DX geothermal power generating system 43 design in FIG. 1 hereinabove), then the respective liquid line shut-off valves 29 (as shown herein on each side of the respective turbine/generators 14) may be changed to respective vapor line shut-off valves 30, such as are shown herein above the respective condensers 21.

What is claimed is:

1. A direct exchange geothermal power production apparatus for use with the single walled casing of a single well extending into and within a subsurface formation below a surface of ground or water, the subsurface formation providing a heat source, the apparatus comprising:
a closed loop of refrigerant piping including a supply refrigerant transport line/pipe and a return refrigerant transport line, wherein the supply refrigerant transport line/pipe and the return refrigerant transport line are disposed in the single well from the top to the bottom of the single well, and where at least a portion of at least one of the return line and the supply line/pipe define a sub-surface heat exchange segment positioned in thermal conductive relation to the heat source;
a working refrigerant fluid disposed in the closed loop of refrigerant piping, the working refrigerant fluid both attaining gravitational energy as it returns within the return line within the well casing and absorbing heat from the heat source as it travels through the sub-surface heat exchanger segment;
a turbine assembly including at least one of a vapor drive, a liquid drive, and an expansion drive turbine disposed in fluid communication with the closed loop of refrigerant piping and configured to operate in response to working refrigerant flow through the turbine to generate mechanical power; and
a condenser disposed in an upper portion of the closed loop of refrigerant piping and having an inlet in fluid communication with the supply refrigerant transport line for receiving working refrigerant vapor and an outlet in fluid communication with the return refrigerant transport line, wherein the condenser is configured to condense the working refrigerant vapor into working refrigerant liquid; and
the sub-surface geothermal heat exchange segment comprising a lower single well supply line/pipe segment that is one of an expanded portion of the supply line within the well casing and a segment of a lower portion of the single well casing itself, in which the upper top end portion of the lower single well supply line/pipe segment that comprises the heat exchange segment is sealed from the remaining upper portion of the well casing and is fluidly communicating with a bottom end of the supply refrigerant transport line/pipe segment and in which a lower portion of the return line extends one of through and past the seal so that the bottom end of the return refrigerant transport line is fluidly communicating with the lower bottom end portion of the lower single well supply line/pipe segment that comprises the heat exchange segment, wherein the lower supply line/pipe heat exchange segment defines an expanded heat exchange surface area positioned in heat transfer relation to the heat source of the subsurface geologic formation to convert the working refrigerant from a more dense and higher pressure liquid refrigerant state to a less dense and lower pressure refrigerant state, so that the return refrigerant transport line comprises a more dense and higher pressure liquid refrigerant transport line and the supply, refrigerant transport line/pipe comprises a less dense and lower pressure refrigerant transport line/pipe.

2. The apparatus of claim 1, in which the working refrigerant comprises R-134A refrigerant.

3. The apparatus of claim 1, in which the lower portions of the supply refrigerant transport line and the return refrigerant transport line extend below the surface less than approximately 27,000 feet, and in which the working refrigerant comprises R-125.

4. The apparatus of claim 1, in which the lower portions of the supply refrigerant transport line and the return refrigerant transport line extend below the surface more than approximately 30,000 feet, and in which the working refrigerant comprises $CO_2$.

5. The apparatus of claim 1, in which the return refrigerant transport line has a first interior cross-sectional area and the supply refrigerant transport line/pipe has a second interior cross-sectional area, and wherein the first interior cross-sectional area is less than the second interior cross-sectional area.

6. The apparatus of claim 1, in which the sub-surface heat exchange segment is configured to permit the heat source of the subsurface formation to convert the working refrigerant from a higher pressure and denser liquid refrigerant phase to one of a vapor phase and a lower pressure and less dense liquid refrigerant phase, so that the return refrigerant transport line to the heat exchange segment comprises a liquid refrigerant transport line and the supply refrigerant transport line/pipe comprises one of a vapor phase and a lower pressure and less dense liquid refrigerant phase refrigerant transport line.

7. The apparatus of claim 6, in which at least one turbine is disposed in the one of a vapor phase and a lower pressure and less dense liquid refrigerant phase refrigerant transport line that exits the single well casing and is upstream of the condenser and comprises one of a one of a refrigerant vapor driven turbine, a liquid refrigerant driven turbine, and a refrigerant expansion driven turbine.

8. The apparatus of claim 1, in which at least one liquid drive turbine is disposed above the well and in fluid communication with the less dense and lower pressure liquid refrigerant transport supply line and is configured to produce mechanical power hi response to a flow of working refrigerant liquid.

9. The apparatus of claim 1, in which the turbine assembly further comprises at least one second and additional turbine disposed in fluid communication with the less dense and lower pressure liquid refrigerant transport supply line and is positioned above the well and downstream of the first liquid drive turbine, wherein the at least one second turbine is configured to induce a phase change of the refrigerant from the less dense and lower pressure liquid refrigerant state to a vapor refrigerant phase, and in which the at least one second turbine generates mechanical power in response to the expanding refrigerant phase change.

10. The apparatus of claim 1, further comprising the expanded heat exchange surface area segment, which segment is one of a lower well casing segment and an expanded part of the working fluid supply line within the lower well casing segment, providing a means both for geothermal heat transfer to the working fluid and for transporting the working fluid up and out of the expanded heat exchange surface area segment, and which lower segment includes a top wall working fluid containment portion of the said lower segment, which top wall effectively seals an upper portion of the well casing from a lower portion of the well casing, with the liquid working fluid return line extending through the seal all the way to the bottom of the expanded heat exchange surface area segment, all within the lower portion of the casing of a single well, which lower well portion segment extends from a depth that is no greater than from the bottom of the well casing up to where the surrounding geology's temperature is at least one of equal to and greater than that of the refrigerant temperature designed for that of the refrigerant working fluid temperature as it exits the well casing at the surface.

11. The apparatus of claim 10, further comprising a heat conductive fill material, with a heat transfer rate of at least 1.4 BTUs/Ft. Hr. Degrees F. at least one of disposed within any empty space within the lower well casing segment around the expanded refrigerant return line and disposed within any empty space around the exterior of the lower well casing segment to a depth that is no greater than from the bottom of the well casing up to where the surrounding geology's temperature is one of equal to and greater than that of the refrigerant temperature designed for that of the refrigerant working fluid temperature as it exits the well casing at the surface.

12. The apparatus of claim 11, in which the heat conductive fill material comprises a cementitious grout.

13. The apparatus of claim 11, in which the heat conductive fill material comprises a metal.

14. The apparatus of claim 10, further comprising:
a first respective thermal insulator surrounding the supply refrigerant transport line from the top wall of the expanded heat exchange surface segment to the top of the well at the surface; and a second respective thermal insulator surrounding the return refrigerant transport line from at least the top wall of the expanded heat exchange surface segment to the top of the well at the surface.

15. The apparatus of claim 14, in which the second respective thermal insulator surrounding the return refrigerant line extends from the lowest elevation of the return line at/near the bottom of the expanded heat exchange surface area segment to the top of the well at the surface.

16. The apparatus of claim 1, in which the supply refrigerant transport line extends from the expanded heat exchange surface segment, which expanded area segment is comprised of at least one of an expanded supply line within a single well casing and a single wall single well casing segment, to the top of the well surface and is surrounded by a first respective thermal insulator above its expanded surface area segment, and in which the return refrigerant transport line extends from the top of the well surface down to and through the lower portion of the expanded surface area segment and is surrounded by a respective second thermal insulator all the way to its lowermost elevation, and in which the first and second respective thermal insulators comprise at least one respective layers of thermal insulation material.

17. The apparatus of claim 16, in which the otherwise empty space within the single well casing surrounding the first and second thermal insulators surrounding the respective supply and return lines above the expanded surface area segment is filled with a thermal insulation comprised of one of a vacuum and a material comprised of at least one of a poorly/non heat conductive fluid, a solid, and a gel.

18. The apparatus of claim 1, in which at least one vapor drive turbine is disposed above the well and is in fluid communication with the less dense and lower pressure vapor refrigerant transport supply line and is configured to produce mechanical power in response to a flow of working refrigerant vapor.

19. The apparatus of claim 1, in which an intermediate portion of the supply refrigerant transport line that extends from the sub-surface heat exchange segment to the surface is surrounded by a first respective insulator, and in which at least an intermediate portion of the return refrigerant transport line that extends from the sub-surface heat exchange segment to the surface is surrounded by a second respective insulator.

20. A direct exchange geothermal power production apparatus for use with the single walled metal casing of a single well extending into and within a subsurface formation below a surface of ground or water, the subsurface formation providing a heat source, the apparatus comprising:
a closed loop of refrigerant piping including a supply refrigerant transport line/pipe and a return refrigerant transport line, wherein the supply refrigerant transport line/pipe and the return refrigerant transport line are disposed in the single well from the top to the bottom of the single well, and where at least a portion of at least one of the return line and the supply line/pipe define a subsurface heat exchanger segment positioned in thermal conductive relation to the heat source;
a working refrigerant fluid disposed in the closed loop of refrigerant piping, the working refrigerant fluid both attaining gravitational energy as it returns within the return line within the well casing and absorbing heat from the heat source as it travels through the sub-surface heat exchange segment;
a turbine assembly, including at least one of a vapor drive, a liquid drive, and an expansion drive turbine disposed in fluid communication with the closed loop of refrigerant piping and configured to operate in response to working refrigerant flow through the turbine to generate mechanical power; and a condenser disposed in an upper portion of the closed loop of refrigerant piping and having an inlet in fluid communication with the supply refrigerant transport line for receiving working refrigerant vapor and an outlet in fluid communication with the return refrigerant transport line, wherein the condenser is configured to condense the working refrigerant vapor into working refrigerant liquid, a first respective thermal insulator surrounding at least an intermediate portion of the liquid return refrigerant transport line extending from the surface to at least a depth where the surrounding geology's temperature is at least one of equal to and less than that of the refrigerant temperature designed for that of the refrigerant working fluid temperature as it exits the well at the surface;

a second respective thermal insulator surrounding an intermediate portion of the vapor refrigerant transport line/pipe extending from the surface to a depth where the surrounding geology's temperature is less than that of the refrigerant temperature designed for that of the refrigerant working fluid temperature as it exits the well at the surface;

where the return line is of a smaller interior cross-sectional area size than that of the supply line/pipe;

where the return line is at least one of operably coupled to and in fluid communication with the supply line/pipe within the single well near the bottom of the single well;

where any otherwise empty space area surrounding the return line and the supply line/pipe within the single well casing is filled with a heat conductive fill material, comprised of one of a solid, a liquid, and a gel, with a heat transfer rate of at least 1.4 BTUs/Ft. Hr. Degrees F, to a depth from the bottom of the well to where the surrounding geology's temperature is one of equal to and greater than that of the refrigerant temperature designated for that of the refrigerant working fluid temperature as it exits the well at the surface;

where any otherwise empty space area surrounding the exterior of the well casing is filled with a heat conductive solid and a liquid fill material, with a heat transfer rate of at least 1.4 BTUs/Ft. Hr. Degrees F. to a depth no greater than from the bottom of the well to where the surrounding geology's temperature is at least one of equal to and greater than that of the refrigerant temperature designed for that of the refrigerant working fluid temperature as it exits the well at the surface;

where any otherwise empty space area surrounding the return line and the supply line/pipe within the single well casing is filled with one of a vacuum and a non-heat conductive/poor heat conductive fill material comprised of one of a solid, a liquid, and a gel, at least to a depth from the top of the well to where the surrounding geology's temperature is one of equal to and greater than that of the refrigerant temperature designed for that of the refrigerant working fluid temperature as it exits the well at the surface; and the sub-surface geothermal heat exchange segment comprising a lower single well supply line/pipe segment that is one of an expanded portion of the supply line within the well casing and a segment of a lower portion of the single well casing itself, in which the upper top end portion of the lower single well supply line/pipe segment that comprises the heat exchange segment is sealed from the remaining upper portion of the well casing and is fluidly communicating with a bottom end of the supply refrigerant transport line/pipe segment and in which a lower portion of the return line extends one of through and past the seal so that the bottom end of the return refrigerant transport line is fluidly communicating with the lower bottom end portion of the lower single well supply line/pipe segment that comprises the heat exchange segment, wherein the lower supply line/pipe heat exchange segment defines an expanded heat exchange surface area positioned in heat transfer relation to the heat source of the subsurface geologic formation to convert the working refrigerant from a more dense and higher pressure liquid refrigerant state to a less dense and lower pressure refrigerant state, so that the return refrigerant transport line comprises a more dense and higher pressure liquid refrigerant transport line and the supply, refrigerant transport line/pipe comprises a less dense and lower pressure refrigerant transport line/pipe.

21. The apparatus of claim 1, further comprising a liquid pump disposed in the liquid refrigerant transport line between the surface and the condenser.

22. The apparatus of claim 1, further comprising a generator operably coupled to the turbine assembly and configured to generate electrical power in response to mechanical power from the turbine assembly.

23. The apparatus of claim 1, further comprising a liquid refrigerant holding tank disposed in the liquid refrigerant transport line immediately downstream of the condenser and before liquid phase refrigerant enters the first of a liquid drive turbine and the sub-surface well.

24. The apparatus of claim 1, further comprising a fan disposed in the vapor refrigerant transport line upstream of the condenser and oriented to advance vapor refrigerant out of a turbine and into the condenser.

25. The apparatus of claim 19, in which the otherwise empty space within the single well casing surrounding the respective first and second thermal insulators surrounding the respective supply and return lines above the sub-surface heat exchange segment is comprised of one of a thermal insulating vacuum and one of a non-heat conductive/poor heat conductive solid, gel, and liquid fill material.

26. A direct exchange geothermal power production apparatus for use with the single walled casing of a single well extending into and within a subsurface formation below a surface of ground or water, the subsurface formation providing a heat source, the apparatus comprising:

a closed loop of refrigerant piping including a supply refrigerant transport line/pipe and a return refrigerant transport line, wherein the supply refrigerant transport line/pipe and the return refrigerant transport line are disposed in the single well from the top to the bottom of the single well, and where at least a portion of at least one of the return line and the supply line/pipe define a sub-surface heat exchange segment positioned in thermal conductive relation to the heat source;

a working refrigerant fluid disposed in the closed loop of refrigerant piping, the working refrigerant fluid both attaining gravitational energy, as it returns within the return line within the well casing and absorbing heat from the heat source as it travels through the sub-surface heat exchange segment;

a turbine assembly including at least one of a vapor drive, a liquid drive, and an expansion drive turbine disposed in fluid communication with the closed loop of refrigerant piping and configured to operate in response to working refrigerant flow through the turbine to generate mechanical power; and a condenser disposed in an upper portion of the closed loop of refrigerant piping and having an inlet in fluid communication with the supply refrigerant transport line for receiving working refrigerant vapor and an outlet in fluid communication with the return refrigerant transport line, wherein the condenser is configured to condense the working refrigerant vapor into working refrigerant liquid;

a liquid holding tank positioned directly under the condenser; and the sub-surface geothermal heat exchange segment comprising a lower single well supply line/pipe segment that is one of an expanded portion of the supply line within the well casing and a segment of a lower portion of the single well casing itself, in which the upper top end portion of the lower single well supply line/pipe segment that comprises the heat exchange segment is sealed from the remaining upper portion of the well casing and is fluidly communicating with a bottom end of the supply refrigerant transport line/pipe segment and in which a lower portion of the return line extends one of through and past the seal so that the bottom end of the return refrigerant transport line is fluidly communicating with the lower bottom end portion of the lower single well supply line/pipe segment that comprises the heat exchange segment, wherein the lower supply line/pipe heat exchange segment defines an expanded heat exchange surface area positioned in heat transfer relation to the heat source of the subsurface geologic formation to convert the working refrigerant from a more dense and higher pressure liquid refrigerant state to a less dense and lower pressure refrigerant state, so that the return refrigerant transport line comprises a more dense and higher pressure liquid refrigerant transport line and the supply, refrigerant transport line/pipe comprises a less dense and lower pressure refrigerant transport line/pipe.

27. The apparatus of claim 26, further comprising respective thermal insulation materials surrounding the respective portions of the respective supply and return refrigerant transport lines/pipes within the upper portion of the well least from the top of the well to where the surrounding geology's temperature is less than that of the refrigerant temperature designed for that of the refrigerant working fluid temperature as it exits the well at the surface.

28. The apparatus of claim 27, in which the otherwise empty space within the single well casing the respectively thermally insulated supply and return lines/pipes within the said upper portion of the well casing is filled with a thermal insulation material comprised of at least one of a poorly/non-heat conductive vacuum, a fluid, a solid, and a gel.

29. The apparatus of claim 26, in which the return refrigerant transport line is disposed within the single well casing, and where the thermal insulation surrounding the return refrigerant transport line extends all the way from the top of the well down to the lowest elevation of the return line within the well casing, inclusive of extending through the area where the surrounding geology's temperature is greater than that of the refrigerant temperature designed for that of the refrigerant working fluid temperature as it exits the well at the surface.

30. The apparatus of claim 26, in which the thermal insulation surrounding the supply refrigerant transport line/pipe extends all the way from the top of the well at least down to the elevation where the surrounding geology's temperature is greater than that of the refrigerant temperature designed for that of the refrigerant working fluid temperature as it exits the well at the surface.

31. The apparatus of claim 27, in which the otherwise empty space within the single well casing surrounding the respective thermal insulation around the respective supply and return lines within the upper portion of the well contains a thermal insulation comprised of at least one of a vacuum and at least one of a non-heat conductive/poor heat conductive solid, fluid, and gel.

32. The apparatus of claim 1 where the otherwise empty space area surrounding the exterior of the well casing is filled with a heat conductive fill material, comprised of one of at least one of solid and a liquid, with a heat transfer rate of at least 1.4 BTUs/Ft. Hr. Degrees F, to a depth no greater than from the bottom of the well to where the surrounding geology's temperature is one of equal to and greater than that of the refrigerant temperature designed for that of the refrigerant working fluid temperature as it exits the well at the surface.

33. The apparatus of claim 1 where a liquid holding tank is provided that is positioned directly under the condenser.

34. The apparatus of claim 20 where a liquid holding tank is provided that is positioned directly under the condenser.

35. The apparatus of claim 26 where a liquid holding tank is provided that is positioned directly under the condenser.

36. The apparatus of claim 1, in which the sub-surface heat exchange segment is configured to permit the heat source of the subsurface formation to convert the working refrigerant from a denser and higher pressure liquid refrigerant to a less dense and lower pressure liquid refrigerant, so that the return refrigerant transport line to the heat exchange segment comprises a denser and higher pressure liquid refrigerant transport line and the supply refrigerant transport line/pipe comprises a less dense and lower pressure refrigerant transport line/pipe.

37. The apparatus of claim 36, in which at least one turbine is disposed in the less dense and lower pressure liquid refrigerant transport line that exits the well casing and is upstream of the condenser and comprises a liquid refrigerant driven turbine.

38. The apparatus of claim 36 in which at least one turbine is disposed in the less dense and lower pressure liquid refrigerant transport line that exits one of the well casing and a liquid refrigerant driven turbine, and is downstream of one of the well casing and the liquid refrigerant driven turbine and is upstream of the condenser and comprises an expansion refrigerant driven turbine, within which the liquid phase refrigerant is expanded into a vapor phase refrigerant.

39. The apparatus of claim 20 where the empty space area surrounding the return line and the supply line within the upper portion of the single well casing is filled with a poor/non-heat conductive fill material, comprised of one of a solid, a liquid, a gel, a vapor, and a vacuum to a depth from the top of the well to where the surrounding geology's temperature is at least one of equal to and greater than that of the refrigerant temperature designed for that of the refrigerant working fluid temperature as it exits the well at the surface.

40. The apparatus of claim 1, in which the turbine is positioned below the elevation of a liquid working fluid holding tank, with the liquid working fluid holding tank situated immediately below the condenser.

41. The apparatus of claim 20, in which the turbine is positioned below the elevation of a liquid working fluid holding tank, with the liquid working fluid holding tank situated immediately below the condenser.

42. The apparatus of claim 26, in which the turbine is positioned below the elevation of a liquid working fluid holding tank, with the liquid working fluid holding tank situated immediately below the condenser.

43. The apparatus of claim 1, in which the turbine is positioned above the elevation of the condenser, with a liquid working fluid holding tank situated immediately below the condenser.

44. The apparatus of claim 20, in which the turbine is positioned above the elevation of the condenser, with a liquid working fluid holding tank situated immediately below the condenser.

45. The apparatus of claim 26, in which the turbine is positioned above the elevation of the condenser, with a liquid working fluid holding tank situated immediately below the condenser.

46. The apparatus of claim 1, in which the exterior upper portion of the casing within the well is not provided/surrounded with a heat conductive fill material above an elevation at least from the bottom of the well where the temperature of the surrounding geology is cooler than the design temperature of the working fluid exiting the well.

47. The apparatus of claim 20, in which the exterior upper portion of the casing within the well is not provided/surrounded with a heat conductive fill material above an elevation at least from the bottom of the well where the temperature of the surrounding geology is cooler than the design temperature of the working fluid exiting the well.

48. The apparatus of claim 26, in which the exterior upper portion of the casing within the well is not provided/surrounded with a heat conductive fill material above an elevation at least from the bottom of the well where the temperature of the surrounding geology is cooler than the design temperature of the working fluid exiting the well.

49. The apparatus of claim 1 with the provision of a double inverted U bend at the lower distal end of the liquid return line, in conjunction with a liquid holding tank positioned above the well, with the bottom of the holding tank operably connected to the upper top end of the liquid return line.

50. The apparatus of claim 20 with the provision of a double inverted U bend at the lower distal end of the liquid return line, in conjunction with a liquid holding tank positioned above the well, with the bottom of the holding tank operably connected to the upper top end of the liquid return line.

51. The apparatus of claim 26 with the provision of a double inverted U bend at the lower distal end of the liquid return line, in conjunction with a liquid holding tank positioned above the well, with the bottom of the holding tank operably connected to the upper top end of the liquid return line.

* * * * *